ELECTRICAL PULSE MODULATORS

Filed March 13, 1952 2 Sheets-Sheet 1

Inventors,
John Edw. Flood,
Samuel D. Harper,
by Hall & Houghton,
Attorneys.

Inventors,
John Edw. Flood
Samuel D. Harper,
by Hall + Houghton
Attorneys.

2,760,160

ELECTRICAL PULSE MODULATORS

John Edward Flood and Samuel Denis Harper, London, England

Application March 13, 1952, Serial No. 276,306

19 Claims. (Cl. 332—9)

This invention relates to electrical pulse modulators and particularly to pulse modulators for time division multiplex systems.

The invention constitutes a modification of the pulse modulator circuit described in the specification of co-pending patent application Serial No. 191,584 (Flowers and Flood), filed Oct. 23, 1950 and has the advantage over the pulse modulator circuit described therein that for a given pulse power and modulating signal power a larger amplitude of modulated pulse can be produced.

According to the present invention an electric pulse modulator comprises at least one modulating circuit having a source of modulating signals shunted by a capacitance and in series connection with a first rectifier, at least one second rectifier connected to that end of the first rectifier which is remote from the source of modulating signals, one or more sources of pulse train current and bias means adapted to render the first rectifier and the, or each, second rectifier non-conducting and conducting respectively in the absence of a pulse from the source, or from any of the sources of pulse train current, or of co-incident pulses from two or more sources, the presence of the pulse, or of the co-incident pulses, reversing the electrical conductivity of the rectifiers.

The first and second rectifiers in one embodiment of the invention are of the same polarity in the series connection and current supply means including at least one source of pulse train current is connected to the junction of the rectifiers.

In another embodiment the first and second rectifiers are of the opposite polarity in the series connection. Where there is only one pulse source it is connected to that end of the second rectifier not connected to the first rectifier or rectifiers. If more than one pulse source is used each is connected to that end of one of the second rectifier not connected to the first rectifier or rectifiers. The bias means is connected to the junction of the first and second rectifiers.

According to a further feature of the invention, a transformer is used to increase the voltage across the capacitor.

In this specification the term rectifier is used to describe any two terminal apparatus presenting substantially different resistances to current flow between the two terminals for the two directions of current flow, for example, a thermionic diode or a crystal diode.

The capacitance which shunt the or each modulating signal source may be an actual capacitor or it may be produced by the stray, inherent capacitance of the modulating signal source circuit.

The modulator may be employed to communicate a selected pulse train from one channel to another. A necessary condition for this is that the impulses of the pulse source coincide with the pulses of the pulse train which it is desired to select.

As examples of the invention various arrangements will now be described in greater detail with reference to the accompanying drawings of which:

Figure 1:
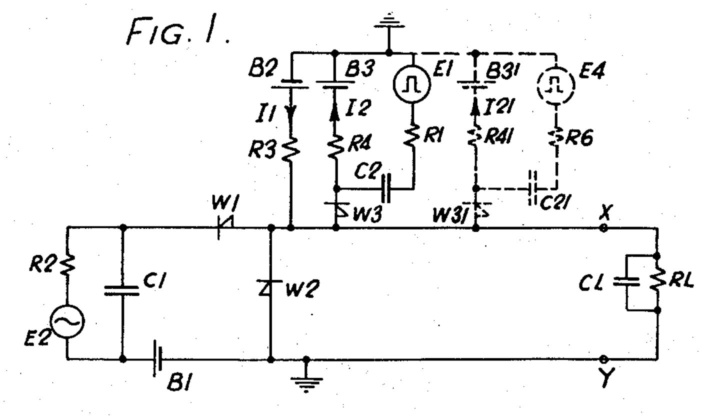
Figs. 1, 2 and 3 are circuit diagrams of three different arrangements.

In Fig. 1 rectifiers W1, W2 and W3, resistors R3, and R4, capacitor C2, source of positive pulse supply E1 impedance R1 and bias sources B2 and B3 form a modulator of the type described in the specification referred to above. E2 is a modulating signal source and the combination of resistor RL and capacitor CL forms a load circuit across which an amplitude modulated pulse is to be developed. CL is the irreducible stray capacitance associated with RL. The impedances R1 and R2 include the internal impedances of sources E1 and E2 respectively. Capacitor C1 acts as a low impedance source of potential difference for the impulse operation of the modulator. RL is required to have a high resistance in order to satisfy the requirements for linearity set out in the above mentioned specification accompanying patent application No. 191,584. In the absence of a pulse from the source E1 the junction between rectifiers W1 and W2 is very near earth potential. The E. M. F.'s of bias sources B2 and B3 and the resistances of resistors R3 and R4 are so chosen that the current I2 flowing through resistor R4 exceeds the current I1 flowing through resistor R3 and the difference between these two currents (I2—I1) flows through rectifier W2 in its conducting direction thus biasing this rectifier to the low resistance portion of its characteristic. The E. M. F. of bias source B1 keeps rectifier W1 biassed to the high resistance portion of its characteristic.

When a pulse is produced by pulse source E1, rectifier W3 is biassed to its high resistance state and the current through it drops substantially to zero. The current through rectifier W2 also drops substantially to zero and current I1 then charges the shunt capacitance CL of the load impedance. As the shunt capacitance of the load impedance is charged the potential of point X rises. As soon as that potential equals the combined E. M. F.'s of bias source B1 and modulating signal source E2, rectifier W1 starts to conduct and, because RL is comparatively large, substantially all the current I1 then flows to charge capacitor C1. If the capacitance of capacitor C1 is sufficiently large the voltage across it will not change appreciably during the remainder of the pulse. Thus the potential drop across the load resistor RL will consist of pulses coincident with the pulses generated by pulse source E1 and of amplitude equal to the potential of the junction between rectifier W1 and modulating signal source and earth at the times of occurrence of the pulses. The pulses developed across the load resistor may be said to be limited to the instantaneous amplitude of the potential difference across the series connection of bias source and capacitor across which the modulating signal source is connected.

The amplitude of the modulation component of the pulse train developed across the load circuit depends on the voltage between the plates of capacitor C1 at the instants of the pulses from pulse source E1. The impedance of capacitor C1 can be made high at the modulating signal frequencies and a transformer can be used to increase the voltage across the capacitor C1.

Figure 2:
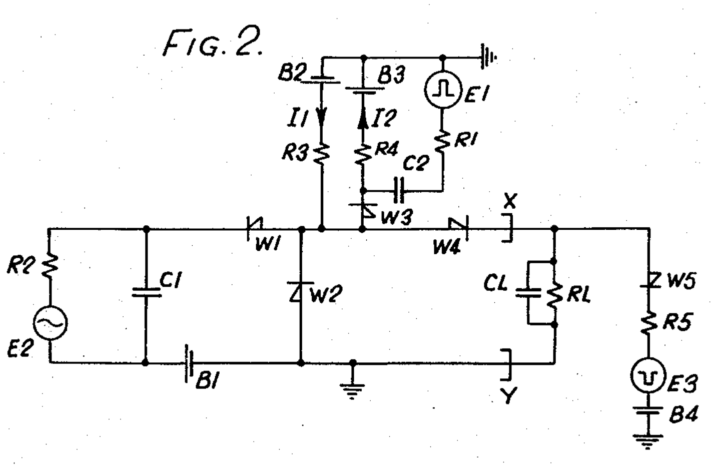

Fig. 2 shows another form of the modulator in which a number of pulse modulators (as indicated by the "commoning" symbols) are connected each through its own rectifier W4 to the common load impedance RL, CL. A discharge circuit comprising rectifier W5 impedance R5 pulse source E3 and bias source B4 is used to reduce substantially the inter-channel crosstalk. The impedance R5 includes the internal impedance of source E3. Capacitor C1 is connected across the modulating signal source E2 as before. Capacitor C1 acts as a low impedance to the current I1 during pulses from pulse source E1. In the absence of a pulse from pulse source E1 the junction between rectifiers W1 and W2 is very near earth potential. The E. M. F.'s of bias sources B2 and B3 and the resistances R3 and R4 are so chosen that the current I2 flowing through resistor R4 exceeds the current I1 flowing through resistor R3, the difference between these two currents (I2—I1) flowing through rectifier W2 in its conducting direction thus biassing this rectifier to the low resistance portion of its characteristic. The E. M. F. of bias source B1 keeps rectifier W1 biased to the high resistance portion of its characteristic.

When a positive pulse is produced by pulse source E1, rectifier W3 is biassed to its high resistance state and the current through it drops substantially to zero. The current through rectifier W2 also drops substantially to zero and current I1 then flows through the forward resistance of rectifier W4 to charge capacitance CL which is part of the load impedance. As capacitance CL is charged the potential of point X rises. As soon as that potential equals the E. M. F. of bias source B1 rectifier W1 starts to conduct and the current I1 then flows to charge capacitance C1. If the capacitance C1 is sufficiently large the voltage across it will not change appreciably during the duration of the pulse from pulse generator E1 and the potential of the plate of capacitor C1 that is not connected to bias source B1 remains substantially at the potential of the generator terminal not earthed. If the voltage across capacitor C1 is made to vary in accordance with a modulating signal, the pulses that appear across the load impedance CL, RL will be amplitude modulated by the same modulating signal.

As shunt resistance RL of the load is high, capacitance CL will discharge only slowly after the end of a pulse from a modulator and may still have appreciable charge left on it when a pulse arrives from another pulse modulator and this may give rise to crosstalk into the pulse train from the other pulse modulator. Pulse source E3 produces negative pulses at the end of all pulses from the pulse modulators connected to the load at points XY. When a pulse is produced by pulse generator E3 the potential of the terminal of rectifier W5 not connected to the load CL, RL is reduced to below earth potential, and rectifiers W2 and W4 act as clamp circuits to prevent the potential of the lead at X dropping appreciably below earth potential.

Figure 3:
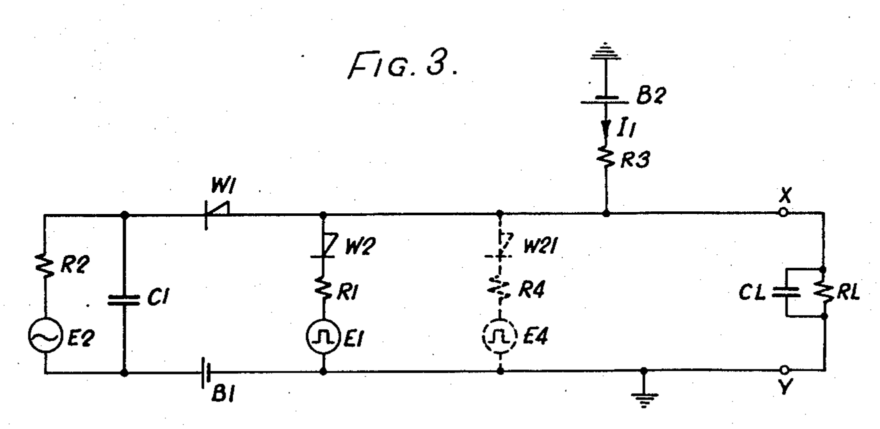

Fig. 3 shows another arrangement in which the modulating signal source E2 together with resistor R2 and the shunt capacitor C1 are in series connection with the rectifier W1 and bias source B1 as before. In this arrangement, however, the rectifier W2 is in opposite polarity in its series connection with the rectifier W1 and is in series connection with resistor R1 and a positive pulse supply source E1. The combination of resistor RL and capacitor CL forms the load circuit across which an amplitude modulated pulse is to be developed as before. CL is the irreducible stray capacitance associated with RL. Capacitor C1 acts as a low impedance source of potential difference for the pulse operation of the modulator, and may be an active capacitor connected in the circuit or it may be the stray capacitance associated with the input circuit. RL is required to have a high resistance in order to satisfy the requirements for linearity. The pulse source E1 is required to have a low internal resistance to direct current and a low internal impedance to pulses of current. In the absence of a pulse from the source E1, current I1 from bias source B2 flows through resistance R3, rectifier W2 and pulse source E1 to earth. As the forward resistance of rectifier W2 and the internal resistance of pulse source E1 are low the junction between rectifiers W1 and W2 is very near earth potential. The E. M. F. of bias source B1 keeps rectifier W1 biassed to the high resistance portion of its characteristic.

When a pulse is produced by pulse source E1, rectifier W2 is biassed to its high resistance state and the current through it drops substantially to zero. Current I1 then charges the shunt capacitance CL of the load impedance causing the potential of point X to rise. As soon as that potential equals the combined E. M. F.'s of bias source B1 and modulating signal source E2, rectifier W1 starts to conduct and because RL is comparatively large, substantially all the current I1 then flows to charge capacitor C1. If the capacitance of capacitor C1 is sufficiently large the voltage across it will not change appreciably during the remainder of the pulse. Thus the potential drop across the load resistor RL will consist of pulses generated by pulse source E1 and of amplitude equal to the potential between earth and the junction of rectifier W1 and modulating signal source E2 at the times of occurrence of the pulses. The impedance of capacitor C1 can be made high at the modulating signal frequencies and a transformer can be used to increase the voltage across the capacitor C1.

It will be understood that a plurality of pulse sources can be connected to a single modulator and a plurality of modulating sources can be connected to a single modulator. It is also possible to connect modulators in tandem in order to carry out multiplexing by stages.

For example, a second source of pulse power shown in dotted lines in Fig. 1 can be connected in parallel with the first source described above and would comprise a rectifier W31 in series with a parallel combination of a resistor R41 and a bias source B31 in series, and a capacitor C21 a pulse generator E4 and an impedance R6 in series. Then if the currents in resistor R4(I2) and resistor R41 (I21) exceed I1 current will flow through rectifier W2 in its conducting direction. When pulses from E1 and E4 coincide the rectifiers W3 and W31 are both biased to their non-conducting ranges and I1 charges the shunt self-capacitance of CL the load impedance as described above. Pulses will be developed across the load impedance only when pulses from the two pulse sources coincide.

As a further example an additional second rectifier W21 and pulse source E4 can be connected as shown in dotted lines in Fig. 3. In the absence of pulses from pulse sources E1 and E4 the current I1 which flows in resistance R3 divides between rectifiers W2 and W21 which are both conducting. The junction of rectifiers W1, W2 and W21 is therefore very near earth potential. When pulse source E1 generates a pulse in the absence of a pulse from pulse source E4 rectifier W2 is rendered non-conducting and the whole of current I1 flows in rectifier W21 and the junction of the rectifiers thus remains very near earth potential. Similarly, when pulse source E4 generates a pulse in the absence of a pulse from pulse source E1 the whole of current I1 flows in rectifier W2 and the junction of the rectifiers remains very near earth potential. When pulses from E1 and E4 coincide, the rectifiers W2 and W21 are both biased to their non-conducting ranges and current I1 charges the shunt self-capacitance CL of the load impedance as described above. Pulses will be developed across the load impedance RL only when pulses from the two pulse sources coincide.

Figure 4:
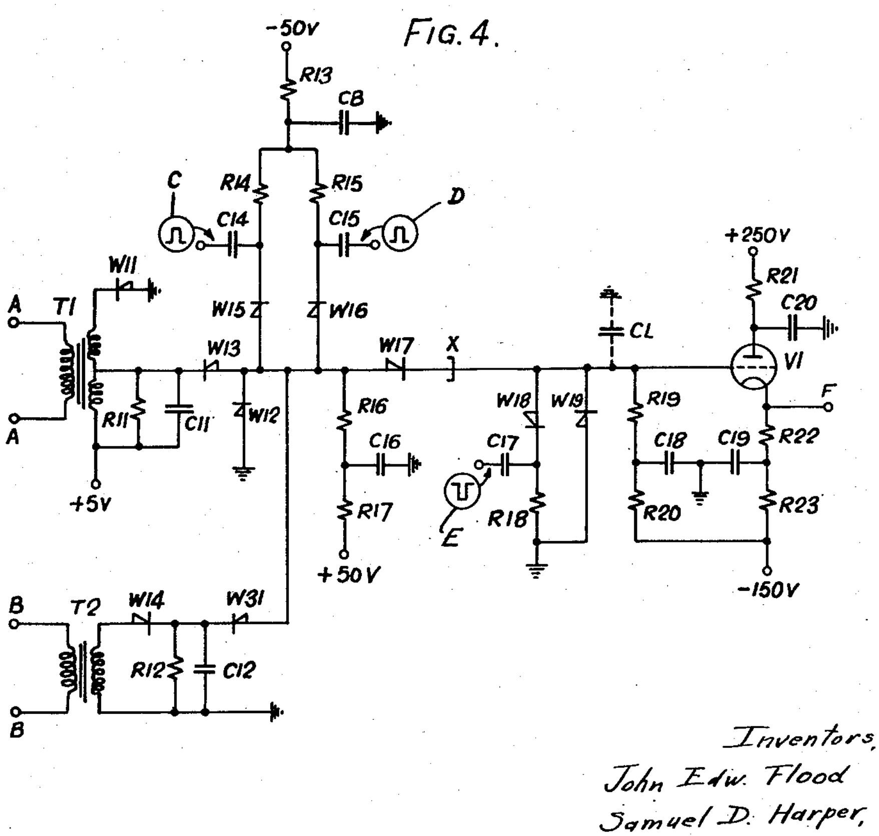
Fig. 4 is a circuit diagram showing a pulse modulator with a discharge circuit and a cathode follower output circuit.

A further embodiment of the invention is shown in Fig. 4 which is a circuit diagram of the pulse modulator with a discharge circuit and cathode follower valve circuit. The pulse modulator comprises the components to the left of X and at X similar pulse modulators may be connected together. The modulator has two sources of modulating signals connected at terminals A, A and B, B of transformers T1 and T2 respectively. Capacitors C11 and C12 are the shunting capacitors of the two sources and are in series with rectifiers W13 and W31 respectively. In the absence of signals from both modulating sources and of pulses from pulse sources connected at terminals C and D the component values of one particular circuit are such that currents of 7 ma. flow through each of rectifiers W15, W16, a current of 5 ma. flows through resistor R16 and a current of 9 ma. therefore, flows through rectifier W12. The potential of the junction between rectifiers W12, W13, W15 and W16 is then slightly below earth potential by the potential difference developed across rectifier W12 by the current of 9 ma. flowing through it. When a positive going pulse of at least 10 volts amplitude is applied to one only of the terminals C, D, the current through the associated rectifier W15 or W16 drops substantially to zero and the current through rectifier W12 drops by 7 ma. to 2 ma. so that the potential of the junction between rectifiers W12, W13, W15 and W16 drops by about ½ volt.

When positive going pulses of at least 10 volts amplitude are applied simultaneously to terminals C and D, the currents through rectifiers W15 and W16 are reduced substantially to zero and no current flows through the rectifier W12. The current through resistor R16 then flows through rectifier W13 if the junction of the latter with capacitor C11 is less positive with respect to earth than the junction of rectifier W31 and capacitor C12 or flows through rectifier W31 if the junction of rectifier W31 with capacitor C12 is less positive than the junction between rectifier W13 and capacitor C11. The end of capacitor C11 which is remote from rectifier W13 is connected to a 5 volt positive source of bias potential. Connected across C11 are a resistance R11 and a secondary winding of transformer T1. An audio frequency modulating signal may be connected to the primary winding of T1 at terminals AA. The potential of the junction of rectifier W14 and capacitor C12 is determined by a control or hold signal. The hold signal, which may advantageously be an alternating current hold signal is connected to the primary winding of the transformer T2 at terminals BB and the voltage across the secondary winding of T2 is rectified by means of rectifier W14 to produce a steady potential across capacitor C12. In the absence of an alternating hold signal applied to terminals BB there is negligible potential difference across capacitor C12 so that when coincident pulses are applied to terminals C and D and current flows through rectifier W31 to charge capacitor C12 the potential of the junction of rectifiers W12, W13, W31, W15 and W16 remains close to earth potential. If a suitable alternating current hold signal is applied to terminals BB the potential of the upper plate of capacitor C12 rises to about 10 volts above earth potential and then, when coincident positive going pulses are applied to terminals C and D the current of 5 ma. from resistor R16 flows through rectifier W17 to charge the stray capacitance, CL, of the load impedance. As the stray capacitance becomes charged the potential of the point X rises as does that of the junction between the rectifiers until, at last, the potential of the junction rises to 5 volts above earth potential. The potential of the upper plate of capacitor C11 is 5 volts above earth potential and rectifier W13 thus begins to conduct and for the remainder of the duration of the coincident pulses the current from resistor R16 flows through rectifier W13 to charge capacitor C11.

The capacitance of C11 is sufficiently large for the charging current to have negligible effect on the potential of the upper plate of the capacitor during the remainder of the duration of the coincident pulses. At the end of the coincident pulses a negative going pulse of about 10 volts amplitude is applied to terminal E and the stray capacitance CL is discharged through rectifier W18. The rectifier W19 prevents the potential of point X from dropping below earth potential. Capacitor C17 becomes charged by the pulses that appear at point X to the maximum amplitude of those pulses and provides the bias source B4 shown in Fig. 2. Thus, when an alternating current hold signal is applied to terminals BB and coincident pulses are applied to terminals C and D a positive going pulse of about 5 volts amplitude appears on the lead connected to X. This pulse is applied to the grid of a cathode follower valve amplifier comprising the valve V1, resistors R19, R20, R21, R22, R23, and capacitors C18, C19, C20. The output from the amplifier appears at terminal F.

If now an audio-frequency modulating signal is applied to the terminals AA the potential of the upper plate of capacitor C11 will differ from 5 volts above earth potential by the instantaneous signal voltage that appears across the winding of the transformer T1 that is connected to capacitor C11 and resistor R11. During the periods when coincident pulses are applied to terminals C and D rectifier W13 will start to conduct when the potential of the junction between rectifiers W12, W13, W15 and W16 equals the potential of the upper plate of capacitor C11 at the instant of the coincident pulses. The output pulses that appear at X and at terminal F will thus be amplitude modulated by the modulating audio-frequency signal applied to terminals AA only when an alternating current hold signal is applied to terminals BB.

The rectifier W11 acts as a voltage limiter, ensuring that the peak negative excursion of the modulating signal voltage developed between the end of the winding connected to rectifier W11 and the end connected to the +5 volt source does not exceed 5 volts. The turns of the secondary winding of transformer T1 are so proportioned in this example that at no time will the modulated pulses at point X have an amplitude of less that 2½ volts.

We claim:

1. A system of the class described, comprising a plurality of devices, each including a source of reference potential, an output lead, charging means connected between said source and lead and operable when not by-passed to raise the potential of said lead above that of said source, and pulse controlled means connected across said charging means and by-passing the same except when pulsed, and each comprising pulse controlled means pulsed on a time division channel individual thereto, with a common load connected to the output leads of said devices through decoupling means across which load output potentials are created by potential rises on said output leads, and means operable in timed relation to said potential rises for dissipating the respective output potentials across said load.

2. A system according to claim 1, in which said dissipating means comprises a one-way current device biased to cut off during the potential rises on said leads and biased to conduct momentarily following generation of said potential rises.

3. A system according to claim 2, in which said dissipating means is biased to conduct by pulse potentials opposite in polarity, and spaced in time from those controlling said by-passing means.

4. A system according to claim 1, said potential dissipating means further comprising a rectifier connected between the reference potential source and the output terminal of said common load and poled to prevent the potential at said output terminal from falling below said reference potential.

5. A device according to claim 1, said pulse controlled means comprising a rectifier circuit connected across said charging means and having a low by-pass resistance and a pulse source connected to bias the rectifier circuit to impart a high by-pass resistance thereto during the interval of a pulse.

6. A device according to claim 5, said rectifier circuit comprising a rectifier poled to offer high by-passing resistance and activating means for passing current through said rectifier to condition it for low by-pass resistance, said pulse source being connected to oppose passage of the activating current through said rectifier.

7. A device according to claim 5, said rectifier circuit comprising a rectifier poled to offer low by-pass resistance and said pulse source being connected to oppose passage of current through said rectifier circuit.

8. A device according to claim 6 comprising a plurality of said pulse controlled activating means connected in parallel across said rectifier and each comprising decoupling means.

9. A device according to claim 7 comprising a plurality of said rectifier and pulse source circuits connected in parallel across said charging means, the rectifiers in said circuits serving to mutually decouple them.

10. A system according to claim 1, each of said plurality of devices further comprising a plurality of potential rise limiters connected in parallel to its output lead, each of said potential rise limiters comprising a one-way current device connected to shunt said load and a source of limiter biasing potential in circuit with said one-way current device for applying a blocking potential thereto.

11. A system according to claim 10, one of each plurality of potential rise limiters comprising a source of direct current hold signals in its source of limiter biasing potential.

12. An electric pulse modulator comprising at least two modulating circuits each having a source of modulating signals shunted by a capacitance and in series connection with a first rectifier, at least one second rectifier connected to the ends of said first rectifiers remote from the source of modulating signals, at least one source of pulse train current, bias means adapted to render a first rectifier non-conducting and said second rectifier conducting in the absence of a pulse from said source of pulse train current, the presence of the pulse reversing the conductivity of the second rectifier and a first rectifier, the ends of the first rectifiers connected to the modulating circuits being at differing potentials relative to a common reference point so that only one first rectifier is rendered conducting in the presence of a pulse from a pulse source.

13. An electric pulse modulator according to claim 12 in which one of the modulating circuits comprises a source of audio frequency signals in series with a source of bias potential and the other modulating circuit comprises a source of control signal such that the absence of the control signal corresponds to an absence of potential from the control source and the presence of a control signal corresponds to a D. C. potential which is greater than the sum of the voltages of the audio-frequency signal and bias source connected to the other first rectifier.

14. A multiplex pulse modulator comprising a plurality of modulators; each modulator comprising at least one modulating circuit having a source of modulating signals shunted by a capacitance and in series connection with a first rectifier, at least one second rectifier connected to that end of the first rectifier remote from the source of modulating signals, at least one source of pulse train current, and bias means adapted to render the first rectifier non-conducting and the second rectifier conducting in the absence of a pulse from the source of pulse train current, the presence of the pulse reversing the electrical conductivity of the rectifiers; said modulators being connected to a common output circuit through a third rectifier connected to the junction of said first and second rectifiers, said first and third rectifiers being of opposite polarity in the series connection; said multiplex pulse modulator further comprising means for discharging the shunt self capacitance of the common output circuit between the appearance of successive pulses on the common output circuit.

15. A multiplex pulse modulator according to claim 14 in which the discharge means comprises a circuit including a fourth rectifier in series connection with the third rectifiers and of the same polarity in the series connection and further current supply means including a pulse train source of a polarity opposite to that of the sources of pulse train current for rendering said fourth rectifier conductive during each discharging pulse and third bias means for rendering said fourth rectifier nonconductive in the absence of a discharging pulse.

16. A multiplex pulse modulator according to claim 15 in which the discharge circuit also includes a fifth rectifier establishing a one way connection thereacross to earth and which prevents the potential of the common output circuit falling below earth potential.

17. A multiplex electric pulse modulator according to claim 15 in which the bias source comprises a parallel connected resistor-capacitor combination which is charged through the fourth rectifier by pulses appearing on the common output circuit.

18. An electric pulse modulator comprising at least one modulating circuit having a source of modulating signals shunted by a capacitance and in series connection with a first rectifier, a second rectifier connected to that end of the first rectifier which is remote from the source of modulating signals, the rectifiers being of the same polarity in the series connection, current supply means connected to the junction of the rectifiers and including at least one source of pulse train current and bias means adapted to render the first rectifier and the second rectifier non-conducting and conducting respectively in the absence of a pulse from the source of pulse train current, the presence of the pulse reversing the electrical conductivity of the rectifiers.

19. An electric pulse modulator comprising at least one modulating circuit having a source of modulating signals shunted by a capacitor and in series connection with a first rectifier, a second rectifier connected to that end of the first rectifier remote from the signal source, the rectifiers being of the same polarity in the series connection, current supply means connected to the junction of the rectifiers and including at least two sources of pulse train current, a source of control signals connected to said junction and bias means adapted to render the first and second rectifiers nonconducting and conducting respectively in the absence of co-incident pulses from the pulse sources and a control signal from the control signal source, the presence of co-incident pulses reversing the electrical conductivity of the rectifiers only if a control signal is also present.

References Cited in the file of this patent

UNITED STATES PATENTS

| | | |
|---|---|---|
| 2,456,026 | Shenk et al. | Dec. 14, 1948 |
| 2,535,303 | Lewis | Dec. 26, 1950 |
| 2,576,026 | Meacham | Nov. 20, 1951 |